April 15, 1941.   E. V. FINERMAN   2,238,219
TEMPERATURE CONTROLLING DEVICE
Filed Aug. 27, 1936
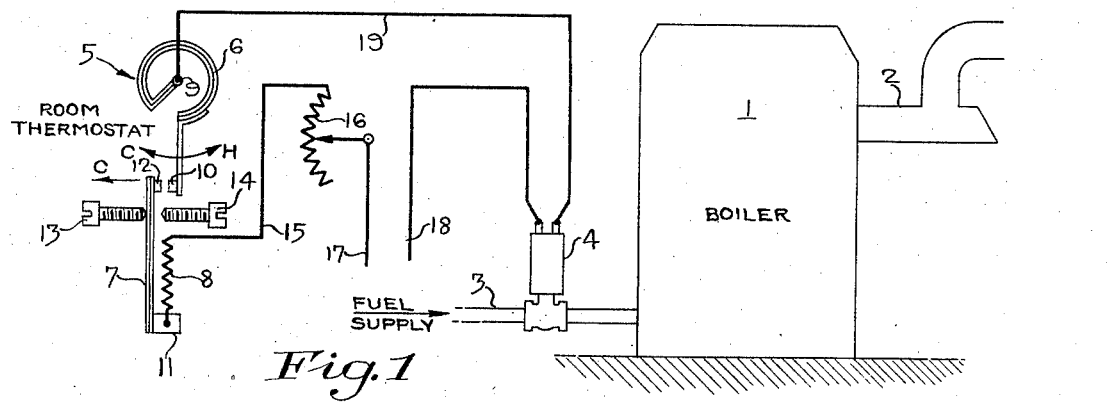
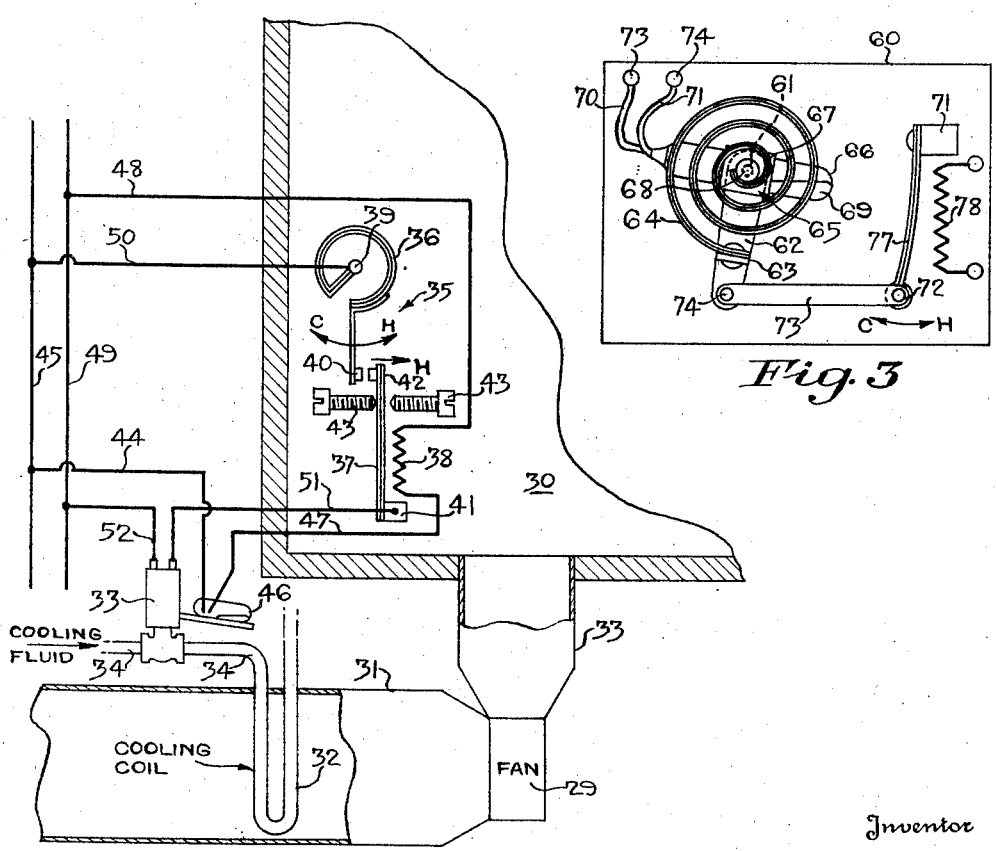
Inventor
Edward V. Fineran
By George H. Fisher
Attorney Patented Apr. 15, 1941

2,238,219

UNITED STATES PATENT OFFICE 2,238,219

TEMPERATURE CONTROLLING DEVICE

Edward V. Fineran, Silver Spring, Md., assignor to Minneapolis-Honeywell Regulator Company, Minneapolis, Minn., a corporation of Delaware Application August 27, 1936, Serial No. 98,179

3 Claims. (Cl. 236—68)

The present invention relates to temperature regulation, particularly to the regulation of temperature in a space occupied by human beings. In order to maintain such a space comfortable, it has been found desirable to vary the temperature maintained therein in accordance with changes in outside temperature. For instance, in the case of heating a building, as the outside temperature decreases, the walls of the building become cooler, resulting in an increase in radiation of heat from the occupants to the walls. This causes the occupants to experience a chilly sensation even though the room temperature may be 70° F. In other words, while a room at 70° F. will seem comfortable to the occupants in mild weather, it will seem chilly when weather conditions are severe. It is thus desirable to raise the room temperature as the outside temperature falls, in order to heat a space to maintain it in a comfortable condition. For instance, the room temperature may be increased from 70° F. to 73° F. through an outside temperature range of 70° F. to 0° F.

In the case of cooling a building, it is also desirable to vary the inside temperature with changes in outside temperature. This is to avoid an excessive "shock" which a person would experience in passing from outside to inside. For instance, while 70° F. may under some conditions be an ideal inside temperature, it would feel cold to a person who just stepped in from an outside temperature of 100° F. It has become common practice, therefore, to raise the inside temperature with increase in outside temperature. For instance, the inside temperature may be raised from 74° F. to 80° F. for an outside temperature change from 75° F. to 95° F.

It is an object of my invention, therefore, to provide an automatic device, which is simple in construction and operation, for varying the setting of a controlling thermostat in accordance with outside temperature changes. A more particular object is to provide a device for securing the aforesaid result without the use of an outside thermostat.

A further object of my invention is to provide a simple arrangement for adjusting the control point of a thermostat in accordance with comfort conditions within the enclosure.

Other objects will appear in the description of the drawings forming a part of this application in which;

Figure 1 is a diagrammatic view showing my invention applied to a heating system; and Figure 2 is a diagrammatic showing of my invention as applied to a cooling system.

Figure 3 is a diagrammatic view of a mercury switch type of thermostat having my invention applied thereto.

In Figure 1, reference character 1 is applied to a boiler which may be of any type for supplying heat to the building. Boiler 1 is shown as having a gas outlet 2 and a fuel supply pipe 3. Interposed in fuel supply pipe 3 is a fuel valve 4 of the electrically actuated type. This valve is designed to open when energized and to remain closed at other times. Located in the room to be heated is a room thermostat generally indicated as 5. This thermostat comprises two separate thermostatic elements each being formed of bimetal, one being shown at 6 and the other at 7. Bimetallic element 6 is subjected to the temperature of the room in which the thermostat is located. Thermostatic element 7, however, is subjected to the influence of a heating element 8 which is located adjacent thereto. Element 6 is fastened at one end to a post 9 and at its other end carries a contact 10. Bimetallic element 7 is anchored at 11 and at its upper extremity carries a contact 12 which cooperates with contact 10. Movement of bimetallic element 7 is restricted by two set screws 13 and 14 located on opposite sides thereof and mounted in any suitable means, not shown. Heating element 8 is connected at one end to thermostatic element 7 and at its other end is connected by wire 15 to a rheostat 16 which in turn is connected to a line wire 17. The other line wire, 18, is connected to one terminal of fuel valve 4, the other terminal of said valve being connected by a wire 19 to the post 9 of thermostatic element 6.

Upon an increase in temperature in the space in which thermostat 5 is located, element 6 will operate to swing its contact 10 to the right and away from contact 12. Upon a decrease in temperature, however, contact 10 will be caused to engage contact 12 thus completing a circuit from line wire 17, rheostat 16, wire 15, heater 8, thermostatic element 7, contact 12, contact 10, bimetallic element 6, wire 19, valve 4 to line wire 18. This will energize the fuel supply valve causing it to open. At this time heat will be supplied to the building. Also as the energizing current for the valve passes through heating element 8, this element is increasing in temperature. When the temperature in the room rises above a predetermined value, contact 10 will disengage from contact 12, causing the fuel valve to close, thus stopping operation of the heating system and also stopping the heating of element 8.

With element 8 only slightly heated, bimetallic element 7 will assume a position against the stop 13. As the temperature of element 8 is increased, however, thermostatic element 7 will swing towards the right thus swinging its contact 12 towards contact 10. It will be seen, therefore, that the position of contact 12, or the control point of the thermostat, will be adjusted in accordance with the temperature of heating element 8. In practice, heating element 8 is of course constructed to act as a heat reservoir, that is, its heat retaining capacity is high as compared to the heating effect of the electric current, and to the cooling effect of radiation and conduction to the surrounding air. Therefore, while the heating element is energized intermittently, its average temperature will be proportional to the ratio of the periods of energization to the periods of non-energization.

With a relatively mild outside temperature, the cooling of the room when the burner is shut off will be relatively slow. Thus after contacts 10 and 12 have been disengaged at the end of a heating period, it will require a relatively long time before the room will be cooled sufficiently to cause these contacts to re-engage. With relatively severe weather conditions, however, the heat loss from the building will be greater, thus causing the room temperature to fall at a faster rate than would occur during mild weather. Due to this, the heat supplying means will be energized a greater proportion of the time during cold weather than during mild weather. As heating element 8 is energized simultaneously with the energization of the heat supplying means, it follows that the average temperature of element 8 will be higher during cold weather than during mild weather. Due to the thermostatic device 7 raising the control point of the thermostat upon increase in the temperature of element 8, the control point of the thermostat is in effect raised upon decrease in outside temperature. As the magnitude of the raise of the control point is dependent upon the temperature of heating element 8, and as the temperature of said element is dependent upon the current flowing therethrough, it follows that the magnitude of change in control point may be controlled by means of rheostat 16. This rheostat of course is not entirely necessary as the heating element may be designed to have the proper resistance to produce the desired heating effect with the prevailing current.

In practice it is desirable to maintain a temperature of about 70° F. in the space when the weather conditions are mild, and to gradually increase the temperature at such a rate that the inside temperature will be maintained at 73° F. when outside temperature is at zero. In order to do this it is necessary to design the resistance of the heating element and/or to control the value of the energizing current so that with the frequency of energization occurring at 0° F., the heating effect of the heating element will be sufficient to swing contact 10 to the right a distance equal to the distance that contact 10 is moved for a three degree temperature change. When bimetallic element 7 is unheated, indicating extremely mild weather conditions, the adjusting screw 13 may be adjusted so that it just touches element 7. Then the room temperature responsive element 6 may be adjusted so that contact 10 just engages contact 12 when the room temperature is 70°. With such an adjustment, as the outside temperature decreases, the boiler and heating element 8 will be operated an increased proportion of the time, causing element 8 to increase in temperature and swing contact 12 to the right. Similarly, when the frequency of energization of the fuel burner and heating element 8 corresponds to that occurring with an outside temperature of 0° F., the temperature of heating element 8 will be such as to cause the bimetallic element 7 to be swung to the right sufficiently to cause contacts 12 and 10 to engage and part at a room temperature of about 73°, thus maintaining a room temperature of 73° F.

In Figure 2, I have shown my invention applied to a system for cooling a building. Reference character 30 broadly designates a room to be cooled. Illustrated below room 30 is a conditioning chamber 31 in which is located a cooling coil 32. An electrically actuated valve 33 is interposed in the fluid line 34 leading to said cooling coil. Conditioning chamber 31 is connected to a fan 29 which discharges into a duct 33 opening into room 30. Located in room 30 is a thermostat broadly designated as 35. This thermostat is formed of a bimetallic element 36 subjected to the room temperature and another bimetallic element 37 which is subjected to the influence of heating element 38. Element 36 is mounted at one end upon a post 39 and carries at its other extremity a contact 40. Element 37 is anchored at 41 and at its upper extremity carries a contact point 42 which cooperates with contact 40. If desired, adjusting screws 43 may be provided for limiting the movement of bimetallic element 37. Instead of placing the heating element in series with the fuel valve as shown in Figure 1, I have provided a separate circuit for energizing this heater. This circuit comprises a wire 44 connected to line wire 45, wire 44 leading to a mercury switch 46 operated by the electrically actuated valve 33. A wire 47 leads from mercury switch 46 to one end of heater 38. The other end of heater 38 is connected by wire 48 with the other wire 49. Whenever valve 33 is open mercury switch 46 is closed thus energizing heater 38.

The post 39 of bimetallic element 36 is connected by a wire 50 to line wire 45. Post 41 of bimetallic element 37 is connected by a wire 51 with one terminal of valve 33, and the other terminal of said valve is connected by wire 52 with the other line wire 49, thus forming a valve actuating circuit.

In operation, as the temperature increases in room 30, element 36 will swing contact 40 to the right against contact 42, thus completing a circuit through valve 33. This causes valve 33 to open and allows cooling fluid to pass through the cooling coil 32. This will result eventually in the temperature in the room dropping, causing element 36 to swing contact 40 away from contact 42 thus breaking the valve opening circuit and causing the valve to close. During the period in which valve 33 is open, mercury switch 46 is closed, causing energization of heating element 38. As in the case of Figure 1, the frequency with which the valve 33 is opened is an indication of outside temperature. With a relatively high outside temperature, the heat leakage into the building would be greater than if the outside temperature were relatively low, thus causing a faster temperature rise in the building after contacts 40 and 42 are opened at the end of a cooling period, than would occur if the outside temperature were lower. As the heating of element 38 takes place during the period in which the cooling system is functioning, and as the cooling system must function a greater proportion of the time in hot weather than in cooler weather, the temperature of heater 38 will be higher in hot weather than in cooler weather. This causes element 37 to assume a position further to the right in hot weather than it would assume in cooler weather, and thereby causes the thermostat 35 to maintain higher temperatures in the room during hot weather than would be maintained in cooler weather.

In practice, it is desirable to maintain an inside temperature of about 74.5° F. when the outside temperature is 75° and to gradually increase the inside temperature to 80° F. as the outside temperature increases from 75° F. to 95° F. As in the case of Figure 1, this result may be secured by proper design of the resistance of the heating element 38 or by controlling the value of the energizing current for said element. Thus, when the bimetallic element 37 is unheated, which indicates infrequent operation of the cooling coil and therefore a relatively cool outside temperature, the adjusting screw 43 may be so positioned that it just abuts element 37. For this same condition the room temperature responsive element 36 may be adjusted in position so that contact 40 just engages contact 42 at a temperature of about 74° F. The resistance of the heating element 38 or the energizing current may then be made such that for a frequency of energization corresponding to the operation of the cooling coil at 95° F., the temperature of the heater 38 will be such as to cause contact 42 to be swung to the right a distance equal to that through which contact 40 is moved for a temperature change of 6 degrees. By this arrangement, when the frequency of operation of the system indicates an outside temperature of 95° the control point of the thermostat will be shifted from 74° to 80° thus maintaining a temperature of 80° F. inside for an outside temperature of 95° F.

While in Figures 1 and 2 I have shown my invention applied to a room thermostat of the open contact type, my invention is also capable of being applied to other types of thermostats such, for instance, as mercury switch thermostats. I have illustrated such a modification in Figure 3. In this figure I have shown a base plate 60 to which is pivotally mounted at 61 a supporting element or lever 62. Lever 62 is provided with an outwardly extending ear 63 to which is secured a spiral or helical bimetallic element 64 of known form. To the other end of bimetallic element 64 is secured a clip 65 which carries the mercury switch 66. The clip 65 includes a portion 67 which engages the mercury switch 66 and a lug portion 68 which is attached to the bimetallic element 64. The mercury switch 66 is of known form, comprising a sealed glass bulb containing two electrodes at one end, not shown, and also containing a globule of mercury 69. To the electrodes are attached leads 70 and 71, the other ends of which may be attached to suitable binding posts 73 and 74.

It will be seen, therefore, that the mercury switch 66 is supported solely by the bimetallic element 64 and that this element is in turn supported by the arm 62 which is pivotally mounted. Upon a variation such, for instance, as a decrease in room temperature, the bimetallic element 64 will cause the mercury switch to be tilted to the left, thereby causing the mercury globule 69 to engage the electrodes completing an electrical circuit from the binding post 73 to the binding post 74. It will be seen, also, that this mercury switch can be tilted to and fro by rotation of the arm 62. If the arm 62 is rotated towards the left, the switch will be tilted so that the globule of mercury separates from the electrodes and remains at the other end of the tube. For such a position, the room temperature must decrease further before the bimetallic element 64 will rotate the mercury switch sufficiently to again close the contacts. From this it may be seen the control point or temperature which the thermostate will maintain may be shifted by adjusting the position of the contact arm 62, and that in this particular instance, movement of the lever to the left lowers the control point of the thermostat, while movement to the right raises the control point thereof.

Subjected to the influence of a heating element 78 is a bimetallic element 77. Element 77 at its upper end is anchored to a post 71 and at its lower end is pivotally connected at 72 with a link 73 the other end of which is pivotally connected to the arm 62 at 74. As in the case of Figures 1 and 2, the position which the bimetallic element 77 will assume is dependent upon the temperature of the heating element 78. Should the temperature of the heating element 78 and bimetallic element 77 be relatively low, element 77 will assume a position towards the left, thus causing arm 62 to be swung towards the left thereby adjusting the room thermostat to maintain a relatively low temperature. With elements 77 and 78 in heated condition, however, the arm 62 will be swung towards the right, thereby causing the bimetallic element 64 to maintain a higher room temperature than would occur in the case of elements 77 and 78 being unheated. In this manner the control point of a mercury switch type of room thermostat may be controlled by means of a secondary thermostatic element which is subjected to the affect of a heating element.

The thermostat illustrated in Figure 3, while being illustrated as arranged for controlling a heating system, is of course also adaptable for use in controlling a cooling system. In such event the position of the mercury switch in the clip would merely be reversed so as to cause closure of the switch upon an increase in temperature instead of upon a decrease in temperature.

From the foregoing it is to be seen that I have provided a simple and dependable arrangement for varying the control point of a room thermostat in accordance with outside temperature. Also, my invention secures this result without the necessity of an outside thermostat. It will be further apparent that may invention is capable of application to all types of room thermostats and to either heating or cooling systems.

While in the illustrated embodiments of my invention I have taken the frequency of operation of the temperature changing means as an indication of outside temperature, it is to be understood that I do not limit myself to this. For instance, I consider it within the scope of my invention to employ an outside thermostat for controlling the heating means. I also consider it within the scope of my invention to vary the heating effect of heater 8 by other conditions than outside temperature.

While I have shown the heating element as being energized simultaneously with the operation of the heating or cooling apparatus, it will be apparent that this arrangement is not necessary. For instance, similar results may be obtained by energizing the heating element when the heating or cooling apparatus is out of operation and by deenergizing such element when the heating or cooling apparatus is in operation. Also, while I have shown my invention as applied to intermittently operated systems, it is also capable of application to systems in which the operation of the heating or cooling apparatus is continuous and modulated.

It will be appreciated that many other changes can be made from the specific examples illustrated without departing from the invention, and I am therefore to be limited only by the scope of the appended claims.

I claim as my invention:

1. In a temperature control system for a space, in combination, temperature changing means for said space, an electromagnetic controller for said temperature changing means, said electromagnetic controller being operative when energized to place said temperature changing means into operation, while acting when deenergized to place said temperature changing means out of operation, a two wire control circuit for said electromagnetic controller, a thermostatic switch responsive to the temperature of said space for controlling said control circuit, said thermostat comprising a thermostatic element, a switch connected into said two wire control circuit and actuated by said thermostatic element, means for adjusting the value of the temperature maintained by said thermostatic switch, said adjusting means including a second thermostatic element adapted to position one of the switch elements independently of said first thermostatic element and an electric heater adjacent said thermostatic element, and means for energizing and deenergizing said electric heater in accordance with operation and non-operation of the temperature changing means in a manner to raise the temperature maintained in said space as the ratio of operation to non-operation increases in value.

2. In a temperature control system for a space, in combination, temperature changing means for said space, an electromagnetic controller for said temperature changing means, said electromagnetic controller being operative when energized to place said temperature changing means into operation, while acting when deenergized to place said temperature changing means out of operation, a two wire control circuit for said electromagnetic controller, a thermostatic switch responsive to the temperature of said space for controlling said control circuit, said thermostat comprising a thermostatic element, a switch connected into said two wire control circuit and actuated by said thermostatic element, and means for adjusting the value of the temperature maintained by said thermostatic switch, said adjusting means including a second thermostatic element adapted to position one of the switch elements independently of said first thermostatic element and an electric heater adjacent said thermostatic element, said electric heater being connected in series with said thermostatic switch in said two wire circuit so that said heater is energized and deenergized in accordance with operation and non-operation of the temperature changing means in a manner to raise the temperature maintained in said space as the ratio of operation to non-operation increases in value.

3. In a temperature control system for a space, in combination, temperature changing means for said space, an electromagnetic controller for said temperature changing means, said electromagnetic controller being operative when energized to place said temperature changing means into operation, while acting when deenergized to place said temperature changing means out of operation, a two wire control circuit for said electromagnetic controller, a thermostatic switch responsive to the temperature of said space for controlling said control circuit, said thermostat comprising a thermostatic element, a switch connected into said two wire control circuit and actuated by said thermostatic element, means for adjusting the value of the temperature maintained by said thermostatic switch, said adjusting means including a second thermostatic element adapted to position one of the switch elements independently of said first thermostatic element and an electric heater adjacent said thermostatic element, an auxiliary switch actuated to closed position by said electromagnetic controller when the same is energized, and a further circuit including said electric heater and auxiliary switch in series for energizing and deenergizing said electric heater in accordance with operation and non-operation of the temperature changing means in a manner to raise the temperature maintained in said space as the ratio of operation to non-operation increases in value.

EDWARD V. FINERAN.